United States Patent Office 3,806,481
Patented Apr. 23, 1974

3,806,481
JOINT SEALING COMPOSITION
Maurice Blatt, Jenkintown, Pa.
(4750 Wingate St., Philadelphia, Pa. 19136)
No Drawing. Filed May 5, 1972, Ser. No. 250,595
Int. Cl. C08g 5/22
U.S. Cl. 260—25                                4 Claims

ABSTRACT OF THE DISCLOSURE

A joint sealing composition for highway pavements or the like comprising a rubber base in conjunction with a mixture of resins including rosin modified phenolic and maleic resins, and bisphenol "A" type epoxy resins. Curatives, such as suitable amines for the epoxy and an oxide and thiocarbamate for the rubber are also present in the compound, as are aromatic hydrocarbon solvents to provide a viscous, yet pumpable solution. The sealant compound comprises two blends which are mixed at the site where used and the mixture is discharged into the joint to be sealed.

---

The present invention relates generally to sealing substances or compositions for concrete roads, walkways, and runways on highways, turnpikes and airports, and more particularly to rubber base sealing compounds which resist deterioration due to aging and embrittlement.

Present joint sealing compounds normally comprise systems containing either asphalt-bituminous, asphalt-epoxy, conventional tar or urethane. However, it has been found that adverse weather conditions seriously and negatively affect the sealant capabilities of these systems. Due to their inherently poor low temperature flexibility characteristics, embrittlement and cracking quickly result when these sealants are exposed to cold weather. Conversely, extremely warm temperatures will cause expansion and flow-out problems in the asphalt-bituminous sealants, and in the asphalt portion of the asphalt-epoxy systems, causing the sealant to flow out of the pavement joint. The expansion of the sealant also exerts stresses in the paving material causing cracks and voids therein. With urethane sealing systems, although such systems are tough and durable, problems have been encountered as a result of oxidative degradation and embrittlement which occurs upon aging due to the inflexibility and brittleness of the compounds employed in this type of system.

Therefore, it is a primary object of the present invention to provide an expansion joint sealing compound for pavements wherein the sealant capabilities of the compound are not seriously affected by normal temperature variances or adverse weather conditions.

A further object of the present invention is to provide a joint sealing compound for pavements wherein the normal aging process is retarded.

Still another object of the present invention is to provide a pavement joint sealing compound which will not expand and flow-out of the joint when exposed to relatively high temperatures, such as occur on a hot summer day.

A further object of the present invention is to provide a joint sealing compound for pavement systems which is capable of absorbing the normal expansion and contraction stresses occurring in the pavement system without cracking or otherwise breaking down.

Generally, the joint sealing compounds of the present invention comprise a styrene-butadiene or butyl rubber base in conjunction with a mixture of resins including rosin modified phenolic and maleic resins, and bisphenol "A" type epoxy resins.

Curatives, such as suitable amines for the epoxy and an oxide and thiocarbamate for the rubber, are also present in the compound. Aromatic hydrocarbon solvents are used to provide a very viscous, but pumpable solution.

More particularly, the joint sealers of the present invention comprise a two-component system, with one component including the rubber base, solvents, and epoxy curatives, in addition to a plasticizer. The second component includes rubber curatives, the phenolic, maleic, and epoxy resins, and solvents. In application, the first and second components may be blended together by conventional means employing a suitable mixer. The mixture is then passed into a rotary pump at the site for ultimate use, and finally the sealant is discharged through an applicator nozzle directly into the pavement joints to be sealed.

The sealing compound of the present invention includes either a styrene-butadiene rubber or a butyl rubber base, instead of the asphalt base normally used in previous sealing mixtures. For optimum results, the butyl rubber used should have a Standinger molecular weight range of 35,000 to 55,000. Styrene-butadiene rubber such as Goodyear Chemical's "Plioflex 1502K" or B. F. Goodrich's "SBR 1006" may be used in the present system. The butyl rubber used may be, for example, Enjay Chemical Company's Butyl 035.

The resins employed in my sealing compound include rosin modified phenolic and maleic resins, plus an epoxy resin. A typical phenolic resin which may be employed in the present invention has the following formulation:

|  | Percent by weight |
|---|---|
| Rosin modified phenol formaldehyde resin | 60 |
| Linseed oil | 10 |
| Mineral spirits | 20 |
| Aromatic hydrocarbon solvent | 10 |
|  | 100 |

It has been found that any rosin modified phenolic resin with a melting point range of 120–180 degrees C. may be used in preparing the present sealing compounds. The phenolic resin may be either novolak or resole formed.

The epoxy resin used as a fixative and a hardener for the sealant is preferably an isopropylidenediphenol resin type resin (p,p-isopropylidenediphenol), preferably having a range of epoxide equivalent of 180 to 195. It has also been discovered that various resins having epoxy equivalent ranges from 170 to 225 can suitably be employed in the present invention. The following is a list of the manufacturers and trade designations of such resins, with their epoxy equivalents:

EPOXIES

| | Epoxide equivalents |
|---|---|
| Shell: | |
| 820 Epon 1 | 180–195 |
| 828 Epon | 180–185 |
| Jones Dabaney: | |
| Epi-Rez. 504 | 170–180 |
| Epi-Rez. 510 | 180–200 |
| Union Carbide: | |
| ERL–2795 | 179–194 |
| ERL–3794 | 174–186 |
| ERL–2774 | 185–200 |
| General Mills: | |
| Gen Epoxy— | |
| 175 | 172–176 |
| 190 | 187–191 |
| M 180 | 177–183 |

Ciba: Epoxide equivalents

Araldite—
- 506 .......................... 172–185
- 507 .......................... 185–192
- 6005 ......................... 175
- 6010 ......................... 185–196
- 6004 ......................... 178
- 6020 ......................... 196–208

Reichold:

Epotuf—
- 6125 ......................... 185–225
- 6130 ......................... 175–210
- 6140 ......................... 175–210

DOW:
- D.E.R. 331 ................... 187–193
- D.E.R. 332 ................... 179 max.
- D.E.R. 334 ................... 178–186

The third resin to be employed in the present system is a non-phenolic rosin-modified maleic resin, which functions as a hardener and as a fast release for the solvents in the system.

Additionally, a polyamine curative for the epoxy resins is included in the sealant compound. The particular amine recommended for use in the preferred embodiment of the invention is triethylene tetramine, although various other equivalent polyamine hardeners of like quality may be substituted, such as diethylenetriamine, tetraethylenepentamine.

Preferably, dithiocarbamate also is included in the compound as the preferred accelerator curative for the rubber. Other accelerators may be used in place of dithiocarbamate, including:

Cadmium diethyldithiocarbamate
Copper diethyldithiocarbamate
Dibenzoyl ester of guinone dioxiene
Diethylene triamine
Di-ortho-tolylguanidine
Diphenylguanidine
Dipentamethylenethiuram tetrasulfide
4,4'-dithiodimorpholine
Glycol dimercaptoacetate
2-mercaptobenzothiazole
Benzothiazyl disulfide
Selenium diethyldithiocarbamate
Telluriune diethyldithiocarbamate
Zinc diethyldithiocarbamate
Triphenylguanidine
Stannous chloride
Plumbic oxide A suitable aromatic hydrocarbon solvent having an initial boiling point range of 226 degrees F. to 285 degrees F. is added to the sealant to produce a very viscous solution which is capable of being discharged through normal fluid pumping apparatus. The solvent also dilutes and cleans the mixture.

To bring about the proper viscosity, an aromatic plasticizer is added to the formulation. Upon blending of the final two components of the sealant as will be explained, a desired Saybolt viscosity of between 250,000 and 500,000 S.S.U. is produced.

In a preferred embodiment, zinc oxide is also included in the subject joint sealing compound. The zinc oxide acts as a stabilizer, performs as a curative for the rubber, and absorbs ultra violet rays attacking the sealant. Preferably, a rubber grade zinc oxide is employed having a fine particle size in the range of about .11–.36 microns and containing at least 98 percent pure zinc oxide on analysis.

The following examples are set forth for purposes of illustration only and are not intended to limit the scope of the invention in any respect.

EXAMPLE I

A joint sealer compound of the present invention was prepared by preparing two separate blends which are ultimately mixed at the site where used. The first blend, hereinafter designated "Blend A," included the following constituents:

BLEND "A"

| | Percent by weight |
|---|---|
| Styrene-butadiene or butyl rubber | 29.2 |
| Aromatic hydrocarbon solvent | 64.6 |
| Aromatic plasticizer | 5.7 |
| Triethylene tetramine | .5 |
| | 100.0 |

In preparing a thousand pound batch of "Blend A," 400 pounds of solvent, 292 pounds of rubber, and 57 pounds of plasticizer were placed in a 150 gallon tank. These materials were then dispensed by means of a vertical mixer of the Cowles or Hockmeyer type, at a speed of between 600 to 800 r.p.m. Within three to five minutes, the remaining 246 pounds of solvent were added. The solution was mixed for ten minutes, then five pounds of triethylene tetramine were added. The batch was mixed for one to two minutes and then discharged. Maximum batch temperatures obtained were 120 degrees F. to 140 degrees F.

The second blend, hereinafter termed "Blend B," was prepared containing the following components:

BLEND "B"

| | Percent by weight |
|---|---|
| Rosin modified phenolic resin | 85.0 |
| Rosin modified maleic resin | 4.2 |
| Epoxy resin | 5.2 |
| Zinc oxide | 2.1 |
| Dithiocarbamate | 3.5 |
| | 100.0 |

In preparing a batch of Blend "B," a 150 gallon tank was charged with quantities of phenolic resin and maleic resin. These constituents were thoroughly mixed before zinc oxide was added and the mixture was dispensed for 5 minutes at 800–1,000 r.p.m. The batch, which attained temperatures of 120–130 degrees F. during mixing, was cooled for fifteen minutes to a 90 degree F. temperature. Epoxy resin and dithiocarbamate were added, and the mixture was stirred well at 600 r.p.m. for 2–5 minutes prior to discharge.

Blends "A" and "B" were mixed on the job site to achieve successful joint sealing. The two blends were placed in a variable speed horizontal mixer capable of running at 18 to 108 r.p.m. Using a ratio of 6 parts Blend "A" and 5 parts Blend "B" by weight, or 54.5% "A" and 45.5% "B," the resulting composition by weight was:

BLEND "A"

| | Percent by weight |
|---|---|
| Rubber | 15.90 |
| Solvent | 35.20 |
| Plasticizer | 3.10 |
| Triethylene tetramine | .27 |

BLEND "B"

| | |
|---|---|
| Phenolic resin | 38.70 |
| Maleic resin | 1.92 |
| Epoxy resin | 2.47 |
| Zinc oxide | .97 |
| Dithiocarbamate | 1.60 |

Using 60 pounds of Blend "A" and 50 pounds of Blend "B" in the horizontal mixer, the compound was capable of being pumped into the joint openings at a flow rate of 2–3 gallons per minute.

The above-described sealant provides satisfactory protection from aging, excessive oxidation, brittleness, and flow-out at temperature ranges of −40 degrees F. to 160 degrees F. The ultra-violet rays of the sun, which are the primary degraders of coatings, are effectively absorbed by the zinc oxide in the sealant, thereby negating their adverse effects. The use of butyl rubber in the system further minimizes oxidation and embrittlement since the butyl rubber molecules are highly saturated in their polymer backbone, which constitutes natural and inherent aging and weathering properties. Styrene-butadiene rubber polymers are highly serviceable, however a stabilizer must be used in the compound due to the high degree of oxidative areas of attack present in the polymer backbone.

During the mixing of Blend "A" and Blend "B," certain chemical reactions take place. First, the polyamines and epoxy resin will cure by crosslinking as follows:

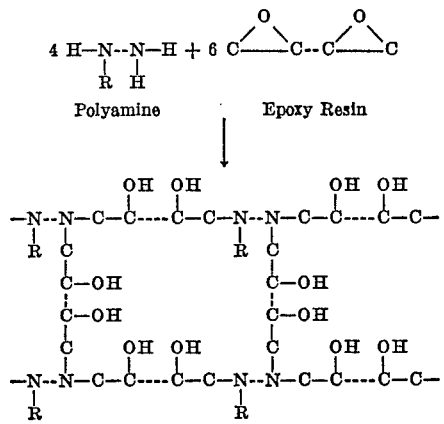

Additionally, the rubber in Blend "A" will undergo a gradual cure and a crosslinking between the rubber and the sulphur in the dithiocarbamate will occur as follows:

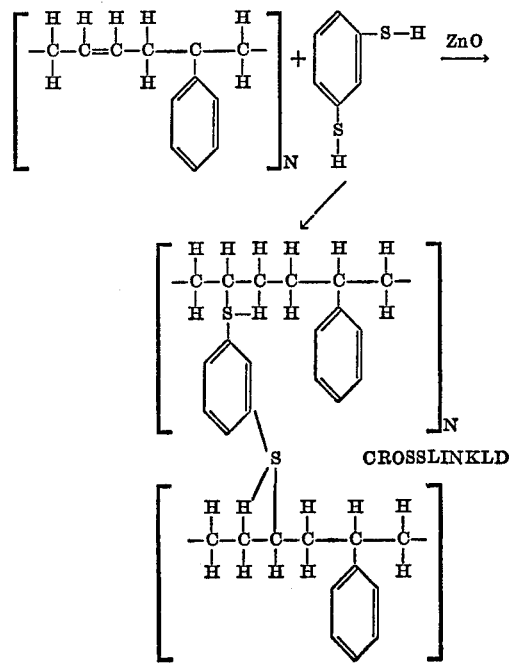

EXAMPLE II

Employing the procedures of Example I to prepare the composition, the following formulation variations have been found to produce successful sealant compounds in accordance with the teachings of the present invention:

| Material | Percent content by weight | | | | | | | | |
|---|---|---|---|---|---|---|---|---|---|
| Styrene-butadiene rubber | 15.90 | | 15.90 | 15.90 | 15.90 | 15.90 | 15.90 | 10.0 | 10.0 | 18.00 |
| Butyl rubber | | 15.90 | | | | | | | | |
| Plasticizer | 3.10 | 3.10 | 3.10 | 3.10 | 3.10 | 3.10 | 3.10 | 3.10 | 5.10 | 3.10 |
| Triethylene tetramine curative | .27 | .27 | .27 | | .27 | .27 | .27 | .27 | 2.7 | .27 | .27 |
| Diethylenetriamine curative | | | | .27 | | | | | | |
| Rosin modified phenolic resin | 38.70 | 38.70 | 38.70 | 38.70 | 38.70 | 38.70 | 38.70 | 44.60 | 38.70 | 35.70 |
| Rosin modified maleic resin | 1.92 | 1.92 | | 1.92 | 1.92 | 1.92 | 1.92 | 1.92 | 1.92 | 1.92 |
| B/S-1 phenolic resin [1] | | | 1.92 | | | | | | | |
| Epoxy resin | 2.37 | 2.37 | 2.37 | 2.37 | 2.37 | 2.37 | 2.37 | 2.37 | 2.37 | 2.37 |
| Aromatic hydrocarbon solvent | 35.20 | 35.20 | 35.20 | 35.20 | 35.20 | 35.20 | 35.20 | 35.20 | 37.67 | 35.20 |
| Accelerator curative | 1.60 | 1.60 | 1.60 | 1.60 | 1.60 | 1.60 | 1.60 | 1.60 | 2.00 | 1.60 |
| Stabilizer | .97 | .97 | .97 | .97 | .97 | .97 | .97 | .97 | 2.00 | .97 |

[1] Amberol rosin-phenolic B/S-1 (Rohm and Haas).

Although I have disclosed herein the preferred practice of my invention, I intend to cover as well any change or modification therein which may be made without departing from the spirit and scope of the invention.

I claim:

1. A joint sealer composition comprising a blend of two components;
   the first component comprising a mixture of a rubber base, an aromatic hydrocarbon solvent, a polyamine curative, and on aromatic plasticizer;
   the second component comprising a mixture of a rubber accelerator, a rosin modified phenolic resin having a melting point range of 120–180° C., a maleic anhydride rosin adduct, an isopropylidenediphenol type epoxy resin having an epoxy equivalent range of 180 to 195, and a zinc oxide stabilizer;
   said first and second components being blended in amounts sufficient to produce a composition having a Saybolt viscosity range of 250,000 to 500,000 S.S.U.;
   said rubber base selected from the group consisting of styrene-butadiene rubber and butyl rubber.

2. The joint sealer composition of claim 1 wherein said polyamine hardener is triethylene tetramine.

3. The joint sealer composition of claim 1 wherein said rubber accelerator is dithiocarbamate.

4. The joint sealer composition of claim 1 wherein said stabilizer is a rubber grade zinc oxide having a particle size in the range of .11 to .37 micron.

References Cited

UNITED STATES PATENTS

| | | | |
|---|---|---|---|
| 3,255,274 | 6/1966 | Yurcick | 260—25 |
| 3,216,848 | 11/1965 | Hart | 260—25 |
| 3,186,960 | 6/1965 | Kivots | 260—24 |
| 3,674,732 | 7/1972 | Pitzalis | 260—25 |

OTHER REFERENCES

Skeist, "Handbook of Adhesives," 1962.

DONALD E. CZAJA, Primary Examiner

W. E. PARKER, Assistant Examiner

U.S. Cl. X.R.

260—27 R, 336 A, 831; 287—189.36

UNITED STATES PATENT OFFICE
CERTIFICATE OF CORRECTION

Patent No. 3,806,481    Dated April 23, 1974

Inventor(s) Maurice Blatt

It is certified that error appears in the above-identified patent and that said Letters Patent are hereby corrected as shown below:

Column 5, line 66, change "CROSSLINKLD" to --CROSSLINKED--.

Column 6, line 29, after "and" change "on" to --an--.

Signed and sealed this 5th day of November 1974.

(SEAL)
Attest:

McCOY M. GIBSON JR.
Attesting Officer

C. MARSHALL DANN
Commissioner of Patents